US012674927B2

(12) United States Patent
Soldi et al.

(10) Patent No.: US 12,674,927 B2
(45) Date of Patent: Jul. 7, 2026

(54) METHOD FOR ROUGHNESS REDUCTION IN MANUFACTURING OPTICAL DEVICE STRUCTURES

(71) Applicant: Applied Materials, Inc., Santa Clara, CA (US)

(72) Inventors: Thomas James Soldi, West Simsbury, CT (US); Joseph Olson, Beverly, MA (US); Morgan Evans, Manchester, MA (US); Ludovic Godet, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 314 days.

(21) Appl. No.: 18/303,804

(22) Filed: Apr. 20, 2023

(65) Prior Publication Data

US 2023/0375774 A1    Nov. 23, 2023

Related U.S. Application Data

(60) Provisional application No. 63/333,071, filed on Apr. 20, 2022.

(51) Int. Cl.
*G02B 6/00*     (2006.01)
*F21V 8/00*     (2006.01)
*G02B 5/18*     (2006.01)

(52) U.S. Cl.
CPC ......... *G02B 6/0065* (2013.01); *G02B 5/1857* (2013.01); *G02B 6/0016* (2013.01); *G02B 6/0036* (2013.01)

(58) Field of Classification Search
CPC .. G02B 6/0065; G02B 6/0016; G02B 6/0036; G02B 5/1857
See application file for complete search history.

(56) References Cited

U.S. PATENT DOCUMENTS 4,405,405 A     9/1983   Fujii et al.
5,116,461 A     5/1992   Lebby et al.
            (Continued)

FOREIGN PATENT DOCUMENTS

CN        1596368 A       3/2005
CN      103364857 A      10/2013
            (Continued)

OTHER PUBLICATIONS

Zhang et al., Sidewall smoothing of micro-pore optics by ion beam etching, Surface and Coatings Technology, vol. 278, 2015, pp. 127-131, ISSN 0257-8972, https://doi.org/10.1016/j.surfcoat.2015. 08.009. (https://www.sciencedirect.com/science/article/pii/ S0257897215301882) (Year: 2015).*
            (Continued)

*Primary Examiner* — Peter Radkowski
(74) *Attorney, Agent, or Firm* — Patterson + Sheridan, LLP

(57)        ABSTRACT

Embodiments described herein relate to a method of using an apparatus for forming waveguides. The method includes positioning a substrate at a first rotation angle, exposing the substrate to an ion beam, forming first partial trenches defined by adjacent angled device structures with the first device angle, rotating the substrate to a second rotation angle, exposing the substrate to the ion beam, etching the first partial trenches, and repeating the method from about 1 cycle to about 100 cycles to form a plurality of trenches defined by adjacent angled device structures. The first rotation angle is selected to form one or more angled device structures with a first device angle relative to a vector parallel to the substrate. The ion beam is configured to contact the substrate at a beam angle θ relative to a surface normal of the substrate.

20 Claims, 5 Drawing Sheets

(56) References Cited

U.S. PATENT DOCUMENTS

| | | | |
|---|---|---|---|
| 6,327,086 | B1 | 12/2001 | Unno |
| 10,535,522 | B1 * | 1/2020 | Shu ..................... H01J 37/3171 |
| 10,816,705 | B2 * | 10/2020 | Moldovan .......... H01L 21/7684 |
| 10,866,419 | B2 | 12/2020 | Basset et al. |
| 11,422,238 | B2 | 8/2022 | Collarte Bondy et al. |
| 11,982,813 | B2 * | 5/2024 | Singh ...................... G02B 5/18 |
| 2001/0026399 | A1 | 10/2001 | Nakabayashi et al. |
| 2007/0041024 | A1 | 2/2007 | Gao et al. |
| 2012/0292535 | A1 | 11/2012 | Choi et al. |
| 2013/0100362 | A1 | 4/2013 | Saeedi et al. |
| 2013/0193106 | A1 | 8/2013 | Chen et al. |
| 2013/0295703 | A1 | 11/2013 | Shi et al. |
| 2014/0285891 | A1 | 9/2014 | Heitzmann |
| 2016/0033784 | A1 * | 2/2016 | Levola ............... G02B 27/4205 |
| | | | 385/37 |
| 2016/0035539 | A1 * | 2/2016 | Sainiemi .............. G02B 5/1857 |
| | | | 204/298.36 |
| 2017/0003505 | A1 | 1/2017 | Vallius et al. |
| 2018/0040654 | A1 | 2/2018 | Christophersen et al. |
| 2018/0138047 | A1 * | 5/2018 | Atikian ............... B81C 99/0095 |
| 2019/0148109 | A1 * | 5/2019 | Yun ..................... H01J 37/3023 |
| | | | 156/345.55 |
| 2019/0154892 | A1 * | 5/2019 | Moldovan .............. G21K 1/067 |
| 2020/0004029 | A1 | 1/2020 | Godet et al. |
| 2020/0135482 | A1 | 4/2020 | Godet et al. |
| 2020/0409151 | A1 * | 12/2020 | Calafiore .......... G02B 27/4272 |
| 2021/0027985 | A1 | 1/2021 | Olson et al. |
| 2021/0247554 | A1 | 8/2021 | Meyer Timmerman Thijssen et al. |
| 2021/0333450 | A1 | 10/2021 | Meyer Timmerman Thijssen et al. |
| 2022/0082936 | A1 | 3/2022 | Franke et al. |
| 2022/0128817 | A1 * | 4/2022 | Singh ............... B29D 11/00769 |
| 2022/0275533 | A1 * | 9/2022 | Quack ..................... C30B 29/04 |
| 2024/0255763 | A1 * | 8/2024 | Singh ............... B29D 11/00769 |

FOREIGN PATENT DOCUMENTS

| | | | | | |
|---|---|---|---|---|---|
| CN | 110764260 | A | 2/2020 | | |
| CN | 112805613 | A | 7/2023 | | |
| JP | H06201909 | A | 7/1994 | | |
| JP | H0815510 | A | 1/1996 | | |
| JP | H1041274 | A | 2/1998 | | |
| JP | 2003022776 | A | 1/2003 | | |
| JP | 2003185819 | A | 7/2003 | | |
| JP | 2003302513 | A | 10/2003 | | |
| JP | 2004512668 | A | 4/2004 | | |
| JP | 2004512673 | A | 4/2004 | | |
| JP | 2012142398 | A | 7/2012 | | |
| JP | 2009516225 | A | 8/2013 | | |
| JP | 2013149750 | A | 8/2013 | | |
| JP | 2015504237 | A | 2/2015 | | |
| JP | 2016048315 | A | 4/2016 | | |
| JP | 2016133539 | A | 7/2016 | | |
| TW | M243670 | | 9/2004 | | |
| TW | 201326768 | A | 7/2013 | | |
| WO | 2008081555 | A1 | 7/2008 | | |
| WO | 2019094304 | A1 | 5/2019 | | |
| WO | WO-2020021501 | A1 * | 1/2020 | ............ | C30B 33/12 |

OTHER PUBLICATIONS

PCT/US2023/019178, International Search Report and Written Opinion dated Aug. 7, 2023, 10 pages.

International Search Report and Written Opinion, PCT/US2019/027828, Aug. 2, 2019, 9 pages.

Taiwan Application No. 08113938, Notice of Allowance dated Jan. 9, 2020, 6 pages.

Taiwan Application No. 109106820, Office Action dated Apr. 28, 2020, 5 pages.

Taiwan Application No. 109106820, Notice of Allowance dated Oct. 28, 2020, 6 pages.

Korean Application No. 10-2020-7010610, Office Action dated Nov. 30, 2021, 5 pages.

European Application No. 19811777.2, Search Report dated Feb. 18, 2022, 7 pages.

Japanese Application No. 2020-565785, Office Action dated Feb. 1, 2022, 4 pages.

Korean Application No. 10-2020-7010610, Office Action dated Aug. 26, 2022, 6 pages.

Chinese Application No. 201980005019.6, Office Action dated Mar. 3, 2023, 11 pages.

International Application No. PCT/US2021/043381, Search Report and Written Opinion, dated Nov. 19, 2021, 9 pages.

Japanese Office Action issued to Patent Application No. 2022-105857 on Aug. 15, 2023.

Korean Office Action issued to Patent Application No. 10-2023-7018095 on Jun. 14, 2023.

Japanese Office Action issued to Patent Application No. 2023-508561 on Jan. 9, 2024.

European Search Report issued to patent application No. 21856430.0 on Jul. 30, 2024.

* cited by examiner

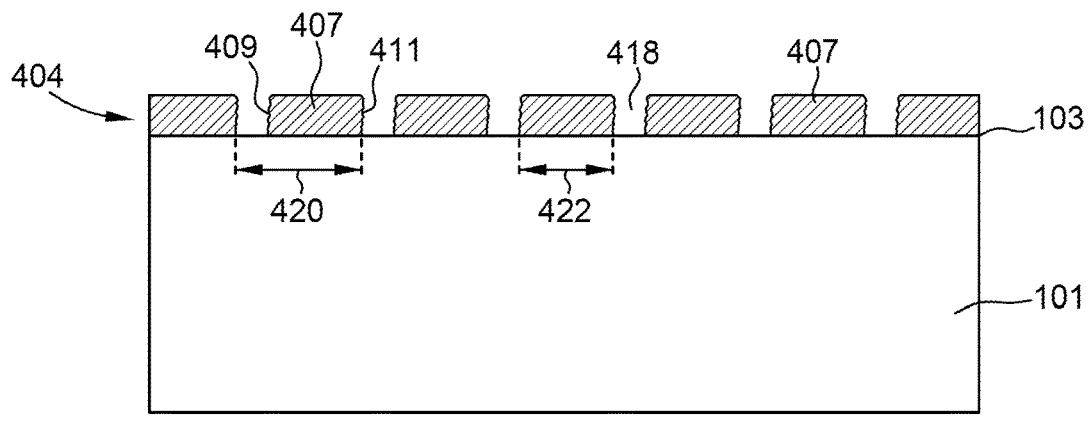
FIG. 4A
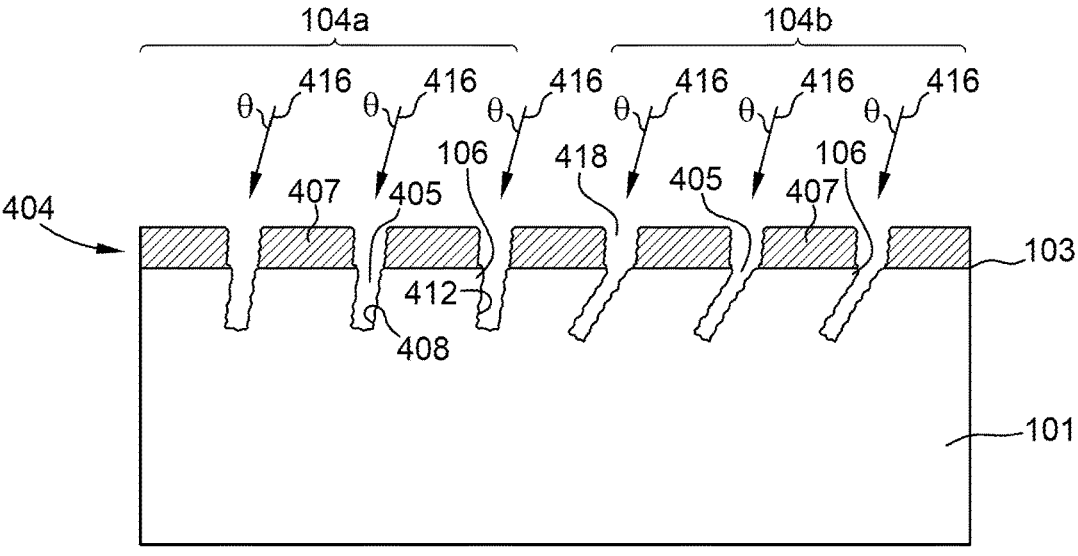
FIG. 4B
FIG. 4C

METHOD FOR ROUGHNESS REDUCTION IN MANUFACTURING OPTICAL DEVICE STRUCTURES

CROSS-REFERENCE TO RELATED APPLICATIONS

This application claims the benefit of U.S. provisional patent application Ser. No. 63/333,071, filed Apr. 20, 2022, which is herein incorporated by reference.

BACKGROUND

Field

Embodiments of the present disclosure generally relate to waveguides for augmented, virtual, and mixed reality. More specifically, embodiments described herein provide for forming waveguide structures.

Description of the Related Art

Virtual reality is generally considered to be a computer generated simulated environment in which a user has an apparent physical presence. A virtual reality experience can be generated in 3D and viewed with a head-mounted display (HMD), such as glasses or other wearable display devices that have near-eye display panels as lenses to display a virtual reality environment that replaces an actual environment.

Augmented reality, however, enables an experience in which a user can still see through the display lenses of the glasses or other HMD device to view the surrounding environment, yet also see images of virtual objects that are generated for display and appear as part of the environment. Augmented reality can include any type of input, such as audio and haptic inputs, as well as virtual images, graphics, and video that enhance or augment the environment that the user experiences. As an emerging technology, there are many challenges and design constraints with augmented reality.

One such challenge is displaying a virtual image overlaid on an ambient environment. Waveguides are used to assist in overlaying images. Generated light is propagated through a waveguide until the light exits the waveguide and is overlaid on the ambient environment. Waveguides may require structures having angles relative to the surface of the optical device substrate.

Accordingly, what is needed in the art are improved methods of forming optical devices including angled device structures with angled etch tools.

SUMMARY

In one embodiment, a method is provided. The method includes positioning a substrate at a first rotation angle, exposing the substrate to an ion beam, forming first partial trenches defined by adjacent angled device structures with the first device angle, rotating the substrate to a second rotation angle, exposing the substrate to the ion beam, etching the first partial trenches, and repeating the method from about 1 cycle to about 100 cycles to form a plurality of trenches defined by adjacent angled device structures. The first rotation angle is selected to form one or more angled device structures with a first device angle relative to a vector parallel to the substrate. The ion beam is configured to contact the substrate at a beam angle $\theta$ relative to a surface normal of the substrate. The second rotation angle is from about −20° to about 20°.

In another embodiment, a method is provided. The method includes positioning a substrate at a first rotation angle, exposing the substrate to an ion beam, forming a partial trench defined by adjacent angled device structures, rotating the substrate to a second rotation angle, exposing the substrate to the ion beam, etching the partial trench, rotating the substrate to a third rotation angle, exposing the substrate to the ion beam, etching the partial trench, and repeating the method from about 1 cycle to about 100 cycles to form a plurality of trenches defined by adjacent angled device structures. The first rotation angle is selected to form one or more angled device structures with a first angle relative to a vector parallel to the substrate. The ion beam is configured to contact the substrate at a beam angle $\theta$ relative to a surface normal of the substrate. The partial trench has a first sidewall and a second sidewall. The second rotation angle is from about −20° to about 20°. The third rotation angle is from about −20° to about 20.

In yet another embodiment, a method is provided. The method includes positioning a substrate at a first rotation angle, exposing the substrate to an ion beam, forming a trench defined by adjacent angled device structures, rotating the substrate to a second rotation angle, exposing the substrate to the ion beam, and removing the hard mask structures. The first rotation angle is selected to form one or more angled device structures with a first angle relative to a vector parallel to the substrate. The substrate has a patterned resist disposed thereon. The patterned resist includes a plurality of hard mask structures and one or more gaps. Each of the hard mask structures has a width. Each of the gaps is defined by adjacent hard mask structures. The ion beam is configured to contact the substrate at a beam angle $\theta$ relative to a surface normal of the substrate. The trench has a first sidewall and a second sidewall. The trench is formed using the ion beam having a substrate etch chemistry to remove the substrate. The second rotation angle is from about −20° to about 20°. The hard mask structures are removed by the ion beam generated by a hard mask etch chemistry different than the substrate etch chemistry.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments of the disclosure and are therefore not to be considered limiting of its scope, and may admit to other equally effective embodiments.

FIG. 4A-4C are schematic, cross sectional views of a substrate during a method according to embodiments described herein

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present invention generally relate to waveguides for augmented, virtual, and mixed reality. More specifically, embodiments described herein provide for methods of forming waveguide structures.

Figure 1A:
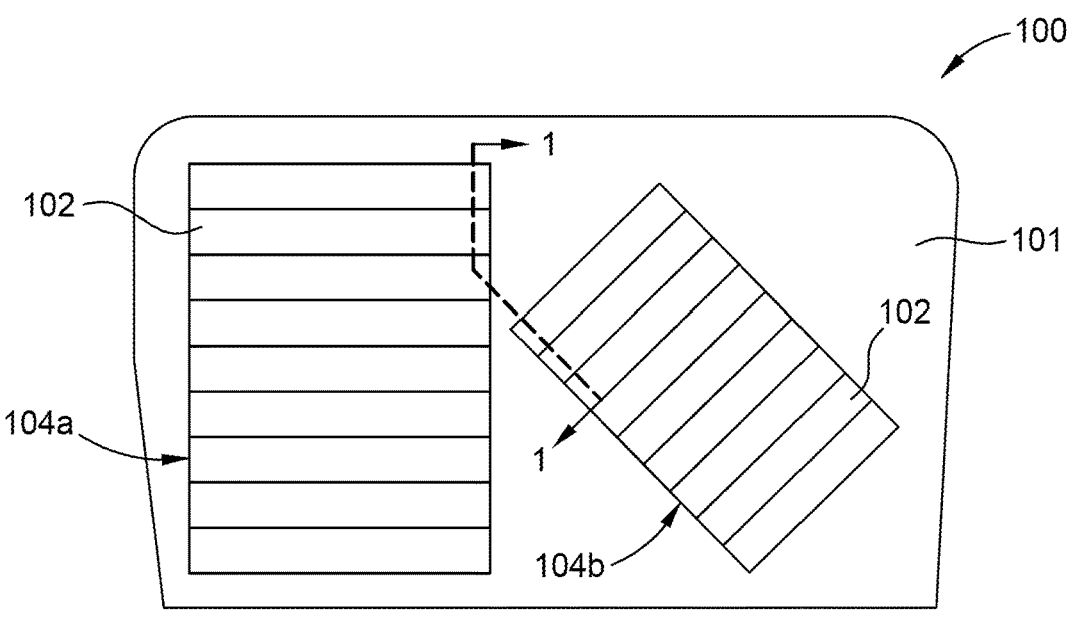
FIG. 1A is a perspective, frontal view of a waveguide according to embodiments described herein.
Figure 1B:
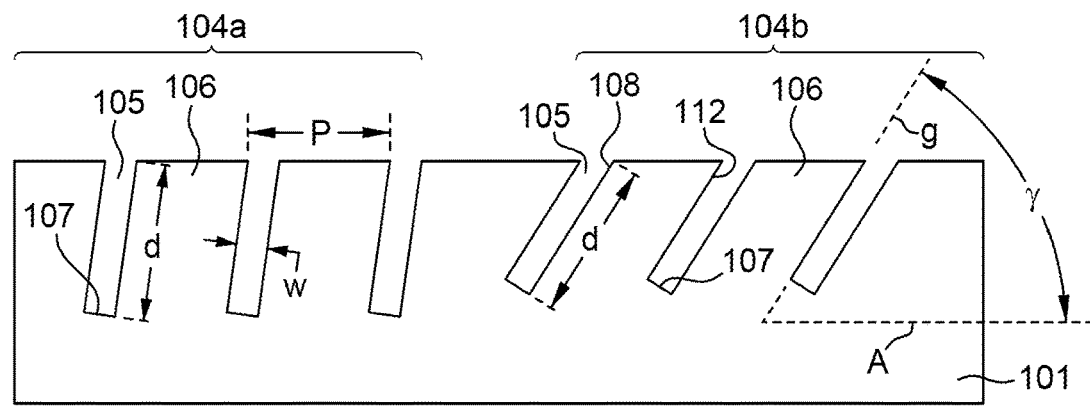
FIG. 1B are schematic, cross-sectional views of a portion of a waveguide according to embodiments described herein.
Figure 1C:
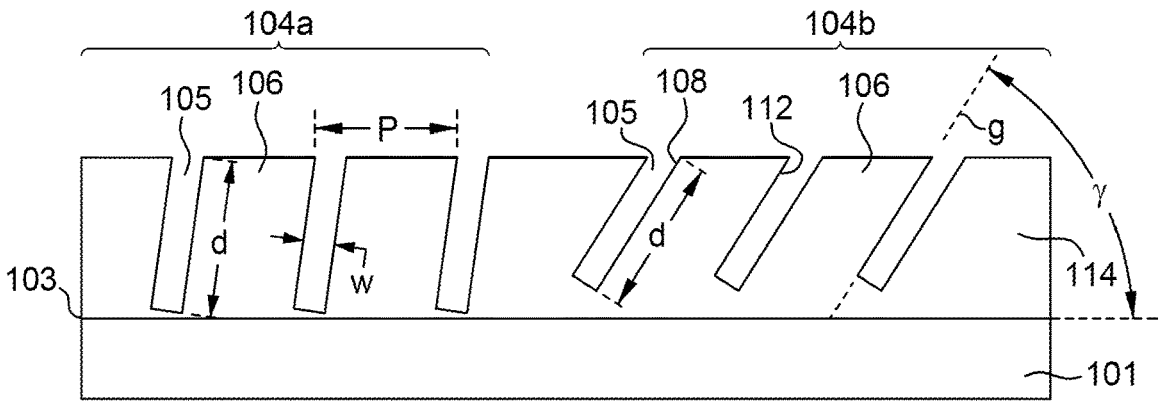
FIG. 1C are schematic, cross-sectional views of a portion of a waveguide according to embodiments described herein.

FIG. 1A illustrates a perspective, frontal view of a waveguide 100. It is to be understood that the waveguide 100 described below is an exemplary waveguide. The waveguide 100 includes a plurality of device structures 102 disposed in (as shown in FIG. 1B) or on (as shown in FIG. 1C) a substrate 101. As shown in FIG. 1C, the device structures 102 are formed in a device layer 114 formed on the substrate 101. The device structures 102 may be nanostructures having sub-micron dimensions, e.g., nano-sized dimensions, such as critical dimensions less than 1 μm. In one embodiment, which can be combined with other embodiments described herein, regions of the device structures 102 correspond to one or more gratings, such as a first grating 104a and a second grating 104b. In one embodiment, which can be combined with other embodiments described herein, the waveguide 100 is a waveguide combiner that includes at least the first grating 104a corresponding to an input coupling grating and the second grating 104b corresponding to an output coupling grating. The waveguide combiner according to the embodiment, which can be combined with other embodiments described herein, may include an additional grating corresponding to an intermediate grating.

FIG. 1B is a schematic, cross-sectional view of a portion of a waveguide 100 at section-line 1-1. FIG. 1C is a schematic, cross-sectional view of a portion of a waveguide 100 at section-line 1-1. In one embodiment, which can be combined with other embodiments described herein, the device structures 102 are angled device structures 106 of a flat waveguide, such as a metasurface. The method 300 described herein with reference to FIG. 3 forms the angled device structures 106. In another embodiment, which can be combined with other embodiments described herein, the device structures 102 are angled device structures 106 of a waveguide combiner, such as an augmented reality waveguide combiner. The waveguide combiner, which can be combined with other embodiments described herein, may include angled device structures 106 in at least one of the gratings 104. Each of the angled device structures 106 includes a first sidewall 108, a second sidewall 112, and a pitch p. The angled device structure 106 (e.g., the first sidewall 108 and second sidewall 112) has a device angle γ. The device angle γ is the angle between a grating vector g and a parallel vector A. The grating vector g is a vector of the first sidewall 108 or the second sidewall 112. The parallel vector A is a vector parallel to a top surface 103 of the substrate 101. The device angle γ may be between about 0° to about 80°. The pitch p corresponds to the distances between first sidewalls 108 of adjacent angled device structures 106.

Adjacent angled device structures 106 define trenches 105. The trenches 105 have a depth d and a width w. In FIG.

1B, the depth d of a trench 105 is the distance from the top surface of the substrate 101 to the deepest point of the trench 105. In FIG. 1C, the depth d of a trench 105 is the distance from a top surface of the device layer 114 to a bottom surface 107 of the trench 105. The width w of a trench 105 is the distance between the first sidewall 108 and a second sidewall 112 of adjacent angled device structures 106.

The first sidewall 108 and second sidewall 112 have a reduced sidewall thickness variation. The sidewall thickness variation is the difference between a maximum point and a minimum point on either the first sidewall 108 or the second sidewall 112. The sidewall thickness variation of the first sidewall 108 and the second sidewall 112 is less than about 20 nm. A reduced sidewall thickness variation may increase the efficiency of the angled device structures 106, and subsequently the overall performance of the waveguide 100.

In one embodiment, which can be combined with other embodiments described herein, the device angle γ of two or more angled device structures 106 are different. As shown in FIGS. 1B and 1C, the device angle γ of the angled device structure 106 of the first grating 104a is different from the device angle γ of the angled device structures of second grating 104b. In another embodiment, which can be combined with other embodiments described herein, the device angles γ of two or more angled device structures 106 are the same. The depth d of two or more angled devices structures 106 may be different. In another embodiment, which can be combined with other embodiments described herein, the depths d of two or more angled devices structures 106 are the same. The pitch p of two or more angled devices structures 106 may be different. In another embodiment, which can be combined with other embodiments described herein, the pitches p of one or more angled devices structures 106 are the same.

The substrate 101 may also be selected to transmit a suitable amount of light of a desired wavelength or wavelength range, such as one or more wavelengths from about 100 to about 3000 nanometers. Without limitation, in some embodiments, the substrate 101 is configured such that the substrate 101 transmits greater than or equal to about 50% to about 100% of an IR to UV region of the light spectrum. The substrate 101 may be formed from any suitable material, provided that the substrate 101 can adequately transmit light in a desired wavelength or wavelength range and can serve as an adequate support for the angled device structures 106 (when the angled device structures 106 are formed in the device layer 114) described herein. Substrate selection may include substrates of any suitable material, including, but not limited to, amorphous dielectrics, non-amorphous dielectrics, crystalline dielectrics, silicon oxide, polymers, and combinations thereof. In some embodiments, which can be combined with other embodiments described herein, the substrate 101 includes a transparent material. Suitable examples may include an oxide, sulfide, phosphide, telluride or combinations thereof. In one example, the substrate 101 includes silicon (Si), silicon dioxide (SiO$_2$), germanium (Ge), silicon germanium (SiGe), silicon carbide (SiC), titanium oxide (TiO$_x$), niobium oxide (NbO$_x$) sapphire, and high-index transparent materials such as high-refractive-index glass.

In some embodiments, which can be combined with other embodiments described herein, the device layer 114 includes, but is not limited to, one or more of silicon oxycarbide (SiOC), titanium dioxide (TiO$_2$), silicon dioxide (SiO$_2$), vanadium (IV) oxide (VOx), aluminum oxide (Al$_2$O$_3$), aluminum-doped zinc oxide (AZO), indium tin oxide (ITO), tin dioxide (SnO$_2$), zinc oxide (ZnO), tantalum pentoxide ($Ta_2O_5$), silicon nitride ($Si_3N_4$), zirconium dioxide ($ZrO_2$), niobium oxide ($Nb_2O_5$), cadmium stannate ($Cd_2SnO_4$), or silicon carbon-nitride (SiCN) containing materials. In some embodiments, which can be combined with other embodiments described herein, the material of the device layer 114 may have a refractive index between about 1.5 and about 2.65. In other embodiments, which can be combined with other embodiments described herein, the material of the device layer 114 may have a refractive index between about 3.5 and about 4.0.

Figure 2:
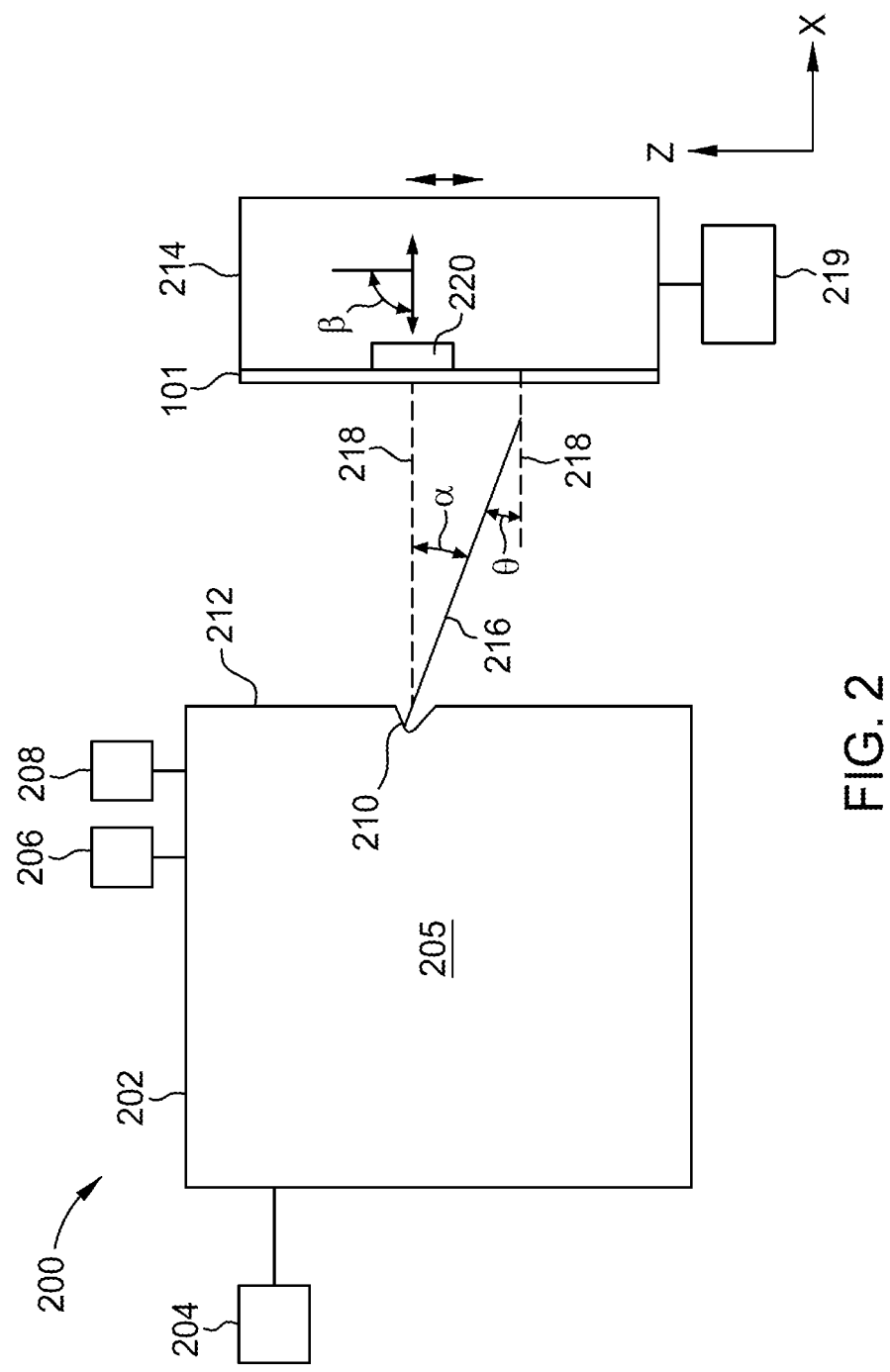
FIG. 2 is a schematic, side view of an angled etch system according to embodiments described herein.

FIG. 2 is a schematic, side view of an angled etch system 200. It is to be understood that the angled etch system 200 described below is an exemplary angled etch system and other angled etch systems may be used with or modified to fabricate the waveguides 100 having angled device structures 106 in accordance with the embodiments of the disclosure.

The angled etch system 200 includes an ion beam chamber 202. A power source 204, a first gas source 206, and a second gas source 208 are coupled to the ion beam chamber 202. In one embodiment, which can be combined with other embodiments described herein, the power source 204 is a radio frequency (RF) power source. The first gas source 206 is in fluid communication with the interior volume 205 of ion beam chamber 202. The first gas source 206 is an inert gas source which supplies an inert gas, such as argon, hydrogen, or helium, to the ion beam chamber 202. The second gas source 208 is in fluid communication with the interior volume 205 of ion beam chamber 202. The second gas source 208 is a process gas source which supplies a process gas to the ion beam chamber 202. The process gas includes, but is not limited to, one or more of a chlorine containing gas, a fluorine containing gas, a bromine containing gas, an oxygen containing gas, a silicon containing gas, a nitrogen containing gas, a hydrogen containing gas, or the like. In the embodiments of the method 300 described herein, which can be combined with other embodiments described herein, two or more process gases may be utilized.

A first process gas may have a substrate etch chemistry that is selective to a hard mask material. The etch selectivity of the first process gas having the substrate etch chemistry provides for a selectivity of the substrate material to the hard mask material (described below) of about 5:1 or greater. The etch selectivity of the first process gas having the device material etch chemistry provides for a selectivity of the device material to a hard mask material of about 5:1 or greater. In one embodiment, which can be combined with other embodiments described herein, the substrate etch chemistry includes a chlorine containing gas, a fluorine containing gas, or a combination thereof. In another embodiment, which can be combined with other embodiments described herein, the device material etch chemistry includes the chlorine containing gas, the fluorine containing gas, or the combination thereof.

A second process gas may have a hard mask etch chemistry that is selective to the substrate material or device material. The etch selectivity of the second process gas having the hard mask etch chemistry provides for a selectivity of the hard mask material to the substrate material of about 10:1 or greater or a selectivity of the hard mask material to the device material of about 10:1 or greater. In one embodiment, which can be combined with other embodiments described herein, the hard mask etch chemistry includes oxygen gas ($O_2$) and carbon tetrafluoride ($CF_4$). In another embodiment, which can be combined with other embodiments described herein, the hard mask etch chemistry includes argon gas (Ar), nitrogen gas ($N_2$), and hydrogen gas ($H_2$). In yet another embodiment, which can be combined with other embodiments described herein, the hard mask etch chemistry includes nitrogen gas ($N_2$) and hydrogen gas ($H_2$).

In operation, a plasma is generated in the ion beam chamber 202 by applying RF power via the power source 204 to the inert gas and the process gas provided to the interior volume 205 of ion beam chamber 202 to generate a plasma. Ions of the plasma of the inert gas and the process gas are extracted through an aperture 210 of an extraction plate 212 to generate an ion beam 216. The aperture 210 of the ion beam chamber 202 is operable to direct the ion beam 216 at an angle α relative to a datum plane 218 oriented normal to the substrate 101 (i.e., the surface normal s). The ion beam 216 includes, but is not limited to, a spot beam, a ribbon beam, or a full substrate-size beam. The ion beam 216 generated includes one of the substrate etch chemistry, the device material etch chemistry, or the hard mask etch chemistry dependent on the process gas utilized.

The substrate 101 is retained on a platen 214 coupled to a first actuator 219. The first actuator 219, which may be a linear actuator, a rotary actuator, a stepper motor, or the like, is configured to move the platen 214 in a scanning motion along a y-direction and/or a z-direction. In one embodiment, which can be combined with other embodiments described herein, the first actuator 219 is further configured to tilt the platen 214 such that the substrate 101 is positioned at a tilt angle β relative to the x-axis of the ion beam chamber 202. The angle α and tilt angle β result in a beam angle ϑ relative to the datum plane 218 normal to the substrate 101. A second actuator 220 may also be coupled to the platen 214 to rotate the substrate 101 about the x-axis of the platen 214.

Figure 3:
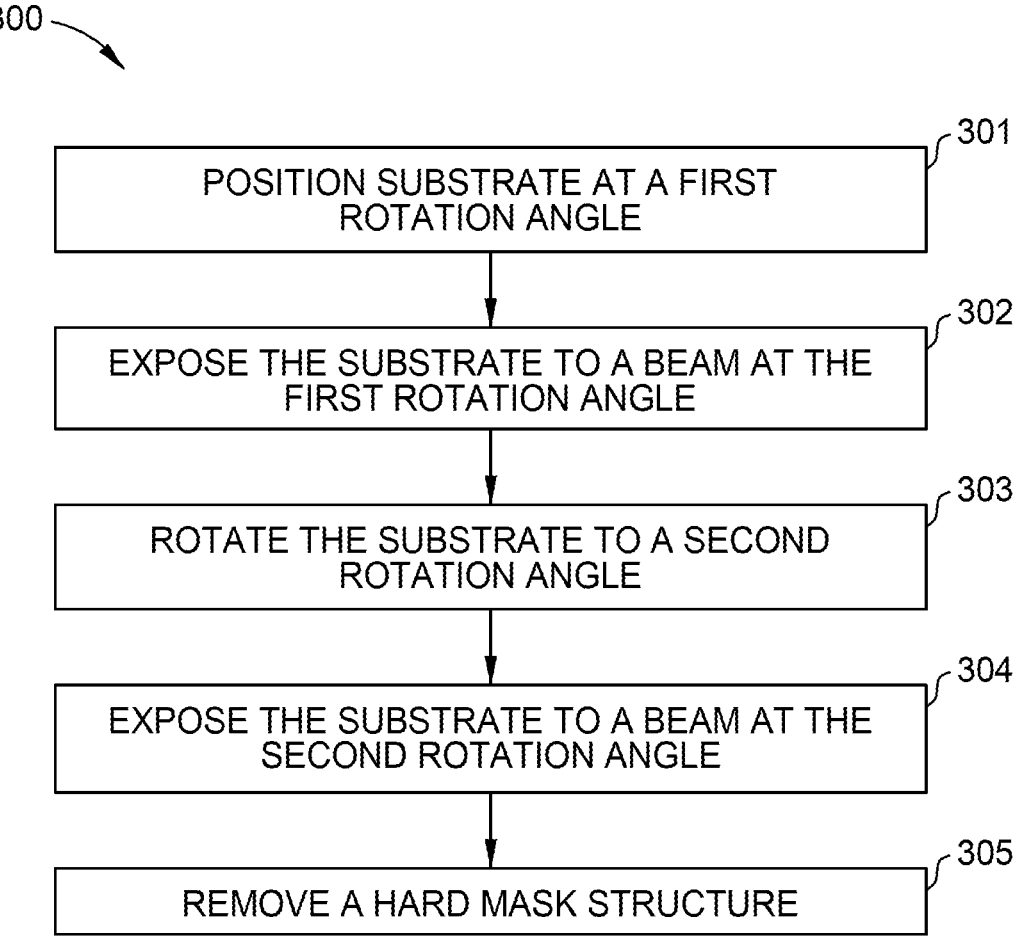
FIG. 3 is a flow diagram of a method for forming a waveguide according to embodiments described herein.
Figure 4D:
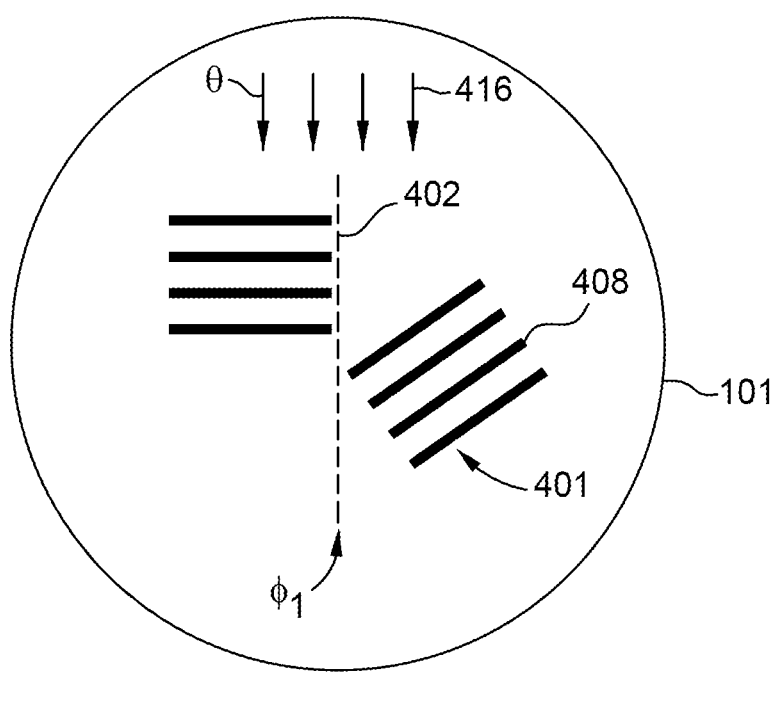
FIGS. 4D-4E are schematic, top views of a substrate during a method according to embodiments described herein.
Figure 4E:
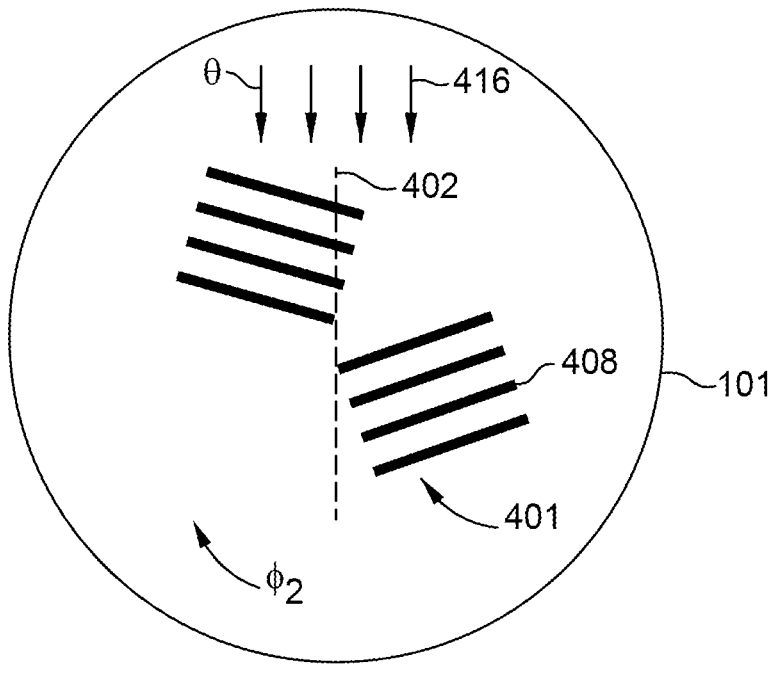

FIG. 3 is a flow diagram of a method 300 for forming waveguide structures. A plurality of angled device structures 106 formed using method 300 are shown in FIGS. 4A-4E. FIGS. 4A-4C are schematic, cross sectional views of a substrate 101 during the method 300. FIGS. 4D-4E are schematic, top views of the substrate 101 during the method 300.

To facilitate explanation, the method 300 will be described with reference to the angled etch system 200 of FIG. 2. However, it is to be noted that angled etch systems other than the angled etch systems described herein may be utilized in conjunction with method 300. In one embodiment, which can be combined with other embodiments described herein, the portion 401 may correspond to a portion or a whole surface of the substrate 101 of a flat waveguide 100 to have the plurality of angled device structures 106 formed thereon. In another embodiment, which can be combined with other embodiments described herein, the portion 401 may correspond to a portion or a whole surface of the substrate 101 of a waveguide combiner to have the plurality of angled device structures 106 formed thereon. The portion 401 may correspond to one or more gratings 104. While FIGS. 4A-4E depict etching the substrate 101 such that the angled device structures 106 are disposed in the substrate 101, a device layer 114 (as described above) may be disposed on the top surface 103 of the substrate 101 such that the angled device structures 106 are disposed in the device layer 114.

At operation 301, as shown in FIG. 4A and FIG. 4D, a substrate 101 is positioned at a first rotation angle $\phi_1$. The first rotation angle $\phi_1$ is defined with respect to datum line 402, as shown in FIG. 4D. In one embodiment, which may be combined with other embodiments described herein, the first rotation angle $\phi_1$ is 0° defined by datum line 402. The substrate 101 or the device layer 114 (not shown) includes a patterned resist layer 404 disposed thereon. The pattern resist layer 404 includes a hard mask that is patterned into a plurality of hard mask structures 407 disposed over the surface 103 of substrate 101. The hard mask material of the patterned resist layer 404 is selected based on the substrate etch chemistry (in embodiments in which the substrate 101 is etched to form the angled device structures 106) or the device material etch chemistry (in embodiments in which the device layer 114 is etched to form the angled device structures 106). In one embodiment, the hard mask material is a photosensitive material such that the patterned resist 404 may be patterned by a lithography process, such as photolithography or digital lithography, or by a laser ablation process to form the plurality of hard mask structures 407. In one embodiment, the hard mask material is an imprintable material that the patterned resist 404 may be patterned by a nanoimprint process to form the plurality of hard mask structures 407. In another embodiment, which may be combined with other embodiments described herein, the hard mask material is a hard mask material and the patterned resist 404 is patterned via one or more etch processes to form the plurality of hard mask structures 407. In yet another embodiment, which may be combined with other embodiments described herein, the patterned resist 404 is an optical planarization layer.

Each hard mask structure 407 has a width 422 from the first sidewall 409 to the second sidewall 411 of the hard mask structure 407. A plurality of gaps 418 are defined by adjacent hard mask structures 407. Each of the gaps 418 has a linewidth 420 between the first sidewall 408 and the second sidewall 412 of adjacent hard mask structures 407.

At operation 302, as shown in FIG. 4B and FIG. 4C, the substrate 101 or device layer 114 is exposed to the beam 416 at the first rotation angle $\phi_1$. The substrate 101 or device layer 114 is exposed to the beam 416 at the beam angle $\vartheta$ relative to the surface normal of the substrate 101 while positioned at the first rotation angle $\phi_1$. In one embodiment, which can be combined with other embodiments described herein, the beam angle $\vartheta$ is about 10 degrees to about 80 degrees relative to the surface normal of the substrate 101. The beam 416 has the substrate etch chemistry or device layer etch chemistry that is selective to the hard mask material, i.e., exposed portions of the substrate 101 or exposed portions of the device layer 114 (not shown) are removed at a higher rate than the hard mask material. The beam 416 etches the exposed portions of the substrate 101 or device layer 114 (as shown in FIG. 4B) to form a partial trench 405. The partial trench 405 has a portion of the depth d of the trenches 105 corresponding to the angled device structures 106. In some embodiments, the whole depth d of the trench 105 may be formed at operation 302. Each partial trench 405 includes a first sidewall 408 and a second sidewall 412.

The angled device structure 106 (e.g., the first sidewall 108 and second sidewall 112) has a device angle $\gamma$. The device angle $\gamma$ may be between about 0° to about 80°, as defined above. In one embodiment, which can be combined with other embodiments described herein, the device angle $\gamma$ of two or more angled device structures 106 are different. As shown in FIG. 4B, the device angle $\gamma$ of the angled device structures 106 of the first grating 104a is different from the device angle $\gamma$ of the angled device structures 106 of the second grating 104b. In another embodiment, which can be combined with other embodiments described herein, the device angle $\gamma$ of two or more angled devices structures 106 are the same.

At operation 303, substrate 101 is rotated to a second rotation angle $\phi_2$. The second rotation angle $\phi_2$ is defined with respect to the datum line 402, as shown in FIG. 4E. In one embodiment, which can be combined with other embodiments described herein, the platen 214 retaining substrate 101 is rotated to the second rotation angle $\phi_2$. In another embodiment, which can be combined with other embodiments described herein, the second rotation angle $\phi_2$ corresponds to between about −20° (340°) to about 20° relative to datum line 402, such as about −10° (350°) to about 10°, such as about −7° (353°) to about 7°. The rotating of the substrate 101 is not limited to a rotation angle $\phi$ corresponding to −20° to about 20°, but may correspond to any predetermined angle $\phi$. In one embodiment, which can be combined with other embodiments described herein, the beam 416 will remain at a beam angle $\vartheta$ relative to a datum plane 218 oriented normal to the substrate 101 (i.e., the surface normal s) throughout method 300. The constant beam angle allows for the throughput to increase because there will not be a need to reconfigure the beam angle $\vartheta$. In one embodiment, which can be combined with other embodiments described herein, the method 300 described herein uses only one angled etch system 200 and requires the hard mask material to only be patterned once to provide for high volume production capability.

At operation 304, the substrate 101 or the device layer 114 is exposed to the beam 416 at the second rotation angle $\phi_2$. The beam 416 etches the first sidewall 408 and the second sidewall 412 of the partial trench 405 to remove roughness and hard mask material in the partial trench 405. The substrate 101 or the device layer 114 is exposed to the beam 416 at the beam angle $\vartheta$ while positioned at the second rotation angle $\phi_2$. In one embodiment, which can be combined with other embodiments described herein, the beam angle $\vartheta$ is about 10 degrees to about 80 degrees relative to the surface normal of the substrate 101.

The beam 416 at the second rotation angle $\phi_2$ etches the first sidewall 408 and second sidewall 412 to remove roughness and hard mask material in the partial trench 405. The removal of the roughness and hard mask material in the partial trench 405 may reduce a sidewall thickness variation of the first sidewall 408 and the second sidewall 412. During operation 302, roughness on the edges of the hard mask structures 407 may create sidewall thickness variation in the partial trench 405 or the trench 105. Exposure to the beam 416 may cause portions of the hard mask structures 407 to break from the hard mask structures 407. The hard mask structure portions may deposit in the partial trench 405 or the trench 105, creating further sidewall thickness variation. In addition, the deterioration of the hard mask structures 407 may decrease the ability of the hard mask structures 407 to effectively mask the substrate 101 or device layer 114. The sidewall thickness variation is the difference between a maximum point and a minimum point on either the first sidewall 108 or the second sidewall 112. The change in the rotation angle exposes different areas of the partial trench 405 to the beam 416, leading to a reduction in the sidewall thickness variation. The beam 416 at the second rotation angle $\phi_2$ reduces the sidewall thickness variation of the first sidewall 108 and the second sidewall 112 to less than about 20 nm. The second rotation angle $\phi_2$ etches the first sidewall 408 and the second sidewall 412 while maintaining the device angle $\gamma$ of the angled device structure 106.

The substrate 101 may be rotated to one or more additional rotation angles, e.g., a third rotation angle $\phi_3$. The substrate 101 or the device layer 114 may be exposed to the beam 416 at the third rotation angle $\phi_3$. The third rotation angle $\phi_3$ corresponds to between about $-20°$ ($340°$) to about $20°$ relative to datum line 402, such as about $-10°$ ($350°$) to about $10°$, such as about $-7°$ ($353°$) to about $7°$. The substrate 101 may be rotated in a direction of rotation opposite from a direction of rotation of the second rotation angle $\phi_2$. The third rotation angle $\phi_3$ may be equal and opposite to the second rotation angle $\phi_2$ with regard to the first rotation angle $\phi_1$, e.g., the second rotation angle $\phi_2$ is $7°$ and the third rotation angle $\phi_3$ is $-7°$ ($353°$) with regard to the first rotation angle $\phi_1$. The beam 416 etches the first sidewall 408 or the second sidewall 412 to further remove roughness and hard mask material in the partial trench 405. The substrate 101 or device layer 114 is exposed to the beam 416 at the beam angle $\theta$ relative to the surface normal of the substrate 101 while positioned at the third rotation angle $\phi_3$. The change in the rotation angle exposes different areas of the partial trench 405 to the beam 416, leading to a reduction in the sidewall thickness variation. The third rotation angle $\phi_3$ etches the first sidewall 408 and the second sidewall 412 while maintaining the device angle $\gamma$ of the angled device structure 106.

The substrate 101 may be repeatedly processed according to operations 301-304 to achieve the desired sidewall thickness variation. Operations 301-304 may be repeated from 1 cycle to about 100 cycles to form the trench 105. During each cycle, a portion of the depth d of the trench 105 may be etched. Each cycle etches a portion of the substrate 101 or the device layer 114 until the desired depth d is achieved. The rotation of the substrate 101 from the first rotation angle $\phi_1$ to the second rotation angle $\phi_1$ allows for the removal of roughness and hard mask material from the first sidewall 408 and second sidewall 412 of the partial trench 405. In some embodiments, the substrate 101 may be rotated from the second rotation angle $\phi_2$ to the third rotation angle $\phi_3$ to further remove roughness and hard mask material from the first sidewall 408 and second sidewall 412. The rotation from the first rotation angle $\phi_1$ to the second rotation angle $\phi_2$ and to the third rotation angle $\phi_3$ allows for the roughness and hard mask material to be removed while maintaining the device angle $\gamma$ of the angled device structure 106.

At operation 305, the hard mask structures 407 are removed. The hard mask structures 407 are exposed to the beam 416 at the beam angle $\theta$. The beam 416 has a chemistry corresponding to the hard mask etch chemistry so that the ions or electrons will only substantially etch the hard mask structures 407 during the hard mask etch process. The hard mask etch chemistry is selective to the substrate 101 or device layer 114, i.e., the hard mask structures 407 are removed at a higher rate than the device layer 114 or substrate 101.

In summation, methods of forming waveguide structures are described herein. The methods utilize rotation of a substrate to have the angled device structures formed thereon. The method removes hard mask material from the trench and reduces the sidewall thickness variation of the angled device structures by rotating the substrate from a first rotation angle to one or more additional rotation angles. The rotation of the substrate exposes portions of the angled device structures to the ion beam in order to remove the hard mask material from the trench and reduce the sidewall thickness variation while maintaining the device angle $\gamma$ of the angled device structure 106. The constant beam angle allows for the throughput to increase because there will not be a need to reconfigure the beam angle $\theta$. The angled device structures can have different device angles without requiring additional processing systems or changes to etch angles.

While the foregoing is directed to embodiments of the present disclosure, other and further embodiments of the disclosure may be devised without departing from the basic scope thereof, and the scope thereof is determined by the claims that follow.

What is claimed is:

1. A method for forming a waveguide, comprising:
positioning a substrate at a first rotation angle relative to a datum line of the substrate, the first rotation angle selected to form one or more angled device structures with a first device angle relative to a vector parallel to the substrate;
exposing the substrate to an ion beam, the ion beam configured to contact the substrate at an beam angle $\theta$ relative to a surface normal of the substrate;
forming first trenches defined by adjacent angled device structures with the first device angle;
rotating the substrate to a second rotation angle relative to a datum line, wherein the second rotation angle is from about $-20°$ to about $20°$;
exposing the substrate to the ion beam;
removing a roughness and a hard mask material from a sidewall of the first trenches using the ion beam; and
repeating the method from about 1 cycle to about 100 cycles to form a plurality of trenches defined by adjacent angled device structures.

2. The method of claim 1, wherein the trenches in the plurality of trenches have a first sidewall and a second sidewall, the first sidewall and the second sidewall having a sidewall thickness variation of less than about 20 nm.

3. The method of claim 1, wherein the second rotation angle is different from the first rotation angle.

4. The method of claim 1, further comprising forming a plurality of second trenches defined by adjacent angled device structures with a second device angle.

5. The method of claim 4, wherein the second device angle is different from the first device angle.

6. The method of claim 1, wherein a device layer is disposed over the substrate such that the one or more angled device structures are formed in the device layer.

7. The method of claim 1, further comprising a patterned resist disposed over the substrate, the patterned resist having a plurality of hard mask structures, wherein adjacent hard mask structures define gaps to expose the substrate.

8. A method for forming a waveguide, comprising:
positioning a substrate at a first rotation angle relative to a datum line of the substrate, the first rotation angle selected to form one or more angled device structures with a first angle relative to a vector parallel to the substrate;
exposing the substrate to an ion beam, the ion beam configured to contact the substrate at a beam angle $\theta$ relative to a surface normal of the substrate;
forming a trench defined by adjacent angled device structures, the trench having a first sidewall and a second sidewall;
rotating the substrate to a second rotation angle relative to the datum line, wherein the second rotation angle is from about $-20°$ to about $20°$;
exposing the substrate to the ion beam;
removing a roughness and a hard mask material from a sidewall of the trench using the ion beam;
rotating the substrate to a third rotation angle relative to the datum line, wherein the third rotation angle is from about $-20°$ to about $20°$;
exposing the substrate to the ion beam;

removing the roughness and the hard mask material from a sidewall of the trench using the ion beam; and repeating the method from about 1 cycle to about 100 cycles to form a plurality of trenches defined by adjacent angled device structures.

9. The method of claim 8, wherein the second rotation angle is different from the third rotation angle.

10. The method of claim 8, wherein a sidewall thickness variation of the first sidewall and the second sidewall is less than about 20 nm.

11. The method of claim 8, wherein the third rotation angle is from about −10° to about 10°.

12. The method of claim 8, wherein a device layer is disposed over the substrate such that the one or more angled device structures are formed in the device layer.

13. The method of claim 8, further comprising a patterned resist disposed over the substrate, the patterned resist having a plurality of hard mask structures, wherein adjacent hard mask structures define gaps to expose the substrate.

14. A method for forming a waveguide, comprising:

positioning a substrate at a first rotation angle relative to a datum line of the substrate, the first rotation angle selected to form one or more angled device structures with a first angle relative to a vector parallel to the substrate, the substrate having a patterned resist disposed thereon, the patterned resist comprising:

a plurality of hard mask structures; and one or more gaps, each of the gaps defined by adjacent hard mask structures;

exposing the substrate to an ion beam, the ion beam configured to contact the substrate at an beam angle ϑ relative to a surface normal of the substrate;

forming a trench defined by adjacent angled device structures, the trench having a first sidewall and a second sidewall, wherein the trench is formed using the ion beam having a substrate etch chemistry to remove the substrate;

rotating the substrate to a second rotation angle relative to the datum line, wherein the second rotation angle is from about −20° to about 20°;

exposing the substrate to the ion beam;

removing the roughness and the hard mask material from a sidewall of the trench using the ion beam; and removing the hard mask structures, wherein the hard mask structures are removed by the ion beam generated by a hard mask etch chemistry different than the substrate etch chemistry.

15. The method of claim 14, wherein a sidewall thickness variation of the first sidewall and the second sidewall is less than about 20 nm.

16. The method of claim 14, wherein the second rotation angle is different from the first rotation angle.

17. The method of claim 14, further comprising:

rotating the substrate to a third rotation angle relative to the datum line, wherein the third rotation angle is from about −20° to about 20°;

exposing the substrate to the ion beam; and removing the roughness and the hard mask material from the sidewall of the trench using the ion beam.

18. The method of claim 17, wherein the third rotation angle is different from the first rotation angle and the second rotation angle.

19. The method of claim 14, wherein a device layer is disposed over the substrate such that the one or more angled device structures are formed in the device layer.

20. The method of claim 19, wherein the angled device structures are formed using the ion beam having a device layer etch chemistry to remove the device layer.

\* \* \* \* \*